US009517803B2

(12) United States Patent
Handzel, Jr.

(10) Patent No.: US 9,517,803 B2
(45) Date of Patent: Dec. 13, 2016

(54) VEHICLE HAVING REAR SPOILER WITH ACTIVE VERTICAL SIDE PLATES, AND METHOD OF CONTROLLING THE SAME

(71) Applicant: GM GLOBAL TECHNOLOGY OPERATIONS LLC, Detroit, MI (US)

(72) Inventor: J. William Handzel, Jr., Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 14/686,133

(22) Filed: Apr. 14, 2015

(65) Prior Publication Data

US 2016/0304139 A1   Oct. 20, 2016

(51) Int. Cl.
G05B 13/02 (2006.01)
B62D 35/00 (2006.01)
B60W 40/10 (2012.01)
B60W 40/114 (2012.01)

(52) U.S. Cl.
CPC ............ B62D 35/007 (2013.01); B60W 40/10 (2013.01); B60W 40/114 (2013.01)

(58) Field of Classification Search
CPC .... B62D 35/007; B60W 40/10; B60W 40/114
See application file for complete search history.

(56) References Cited

U.S. PATENT DOCUMENTS

| 5,971,714 A * | 10/1999 | Schaffer | F04B 11/0041 417/44.2 |
|---|---|---|---|
| 2002/0021679 A1 * | 2/2002 | Paneth | H04L 1/0001 370/330 |
| 2012/0013147 A1 * | 1/2012 | Ezaka | B29C 65/06 296/181.5 |
| 2012/0143399 A1 * | 6/2012 | Noumura | B60W 30/02 701/1 |
| 2012/0265431 A1 * | 10/2012 | Hayakawa | B60T 7/22 701/301 |

* cited by examiner

Primary Examiner — Ian Jen
(74) Attorney, Agent, or Firm — Quinn Law Group, PLLC

(57) ABSTRACT

A vehicle includes a rear spoiler having a central portion, a first vertical side plate that is disposed at a first lateral edge of the central portion, and a second vertical side plate that is disposed at a second lateral edge of the central portion. An actuating system is coupled to the first vertical side plate and the second vertical side plate for moving the first vertical side plate and the second vertical side plate independently of each other about a first vertical axis and a second vertical axis respectively. A vehicle controller senses a current operating condition of the vehicle, determines an optimal position for each of the first vertical side plate and the second vertical side plate respectively for the current operating condition, and signals the actuating system to move the first vertical side plate and the second vertical side into their respective optimal positions.

20 Claims, 4 Drawing Sheets

VEHICLE HAVING REAR SPOILER WITH ACTIVE VERTICAL SIDE PLATES, AND METHOD OF CONTROLLING THE SAME

TECHNICAL FIELD

The disclosure generally relates to a vehicle having an aerodynamic control system, and a method of controlling the vehicle.

BACKGROUND

Some vehicles are equipped with an aerodynamic control system, which may include a rear spoiler to control aerodynamic forces acting on the vehicle. The aerodynamic control system is used to improve the dynamic performance of the vehicle. The rear spoiler includes a central, horizontal portion, which is often configured as a downforce generating device. The central portion of the rear spoiler may generate a downforce on the vehicle as air passes across the rear spoiler. In some examples, the rear spoiler may include vertical side plates that are fixedly attached to the lateral edges of the central, horizontal portion.

SUMMARY

A vehicle is provided. The vehicle includes a body that extends along a longitudinal axis. The body defines a width that is perpendicular to the longitudinal axis of the body. An aerodynamic control system is attached to the body. The aerodynamic control system includes a central portion, a first side plate, and a second side plate. The central portion extends laterally across the width of the body. The first side plate is disposed at a first lateral edge of the central portion, is positioned in a substantially vertical orientation, and extends in a direction substantially parallel with the longitudinal axis of the body. The second side plate is disposed at a second lateral edge of the central portion, is positioned in a substantially vertical orientation, and extends in a direction substantially parallel with the longitudinal axis of the body. An actuating system is coupled to each of the first side plate and the second side plate. The actuating system is operable to move the first side plate and the second side plate independently of each other about a first vertical axis and a second vertical axis respectively.

A method of controlling a vehicle is also provided. The vehicle includes a body, and a rear spoiler having a central portion, a first vertical side plate, and a second vertical side plate. The first vertical side plate is disposed at a first lateral edge of the central portion. The second vertical side plate is disposed at a second lateral edge of the central portion. The method includes sensing at least one operating condition of the vehicle with at least one vehicle sensor, and determining a current spatial orientation of the body relative to a current direction of travel of the body based on the sensed operating condition of the vehicle. The current spatial orientation of the body relative to the current direction of travel of the body is determined with a controller. The controller includes tangible non-transitory memory having computer executable instructions recorded thereon, including an aerodynamic control module. The controller further includes a processor operable to execute the aerodynamic control module to determine the current spatial orientation of the body relative to the current direction of travel of the body. The aerodynamic control module of the controller is used to determine an optimal position for each of the first vertical side plate and the second vertical side plate respectively, relative to the longitudinal axis, for the current spatial orientation of the body relative to the current direction of travel of the body. An actuating system is signaled by the controller to move the first vertical side plate and the second vertical side plate into their respective optimal positions for the current spatial orientation of the body relative to the current direction of travel of the body. The first vertical side plate and the second vertical side plate are then moved into their respective optimal positions with the actuating system.

Accordingly, the aerodynamic control system includes a rear spoiler with vertical side plates that are independently moveable relative to each other. The vertical side plates of the rear spoiler may be positioned to optimize the dynamic performance of the vehicle, for the current spatial orientation of the vehicle and the current direction of travel of the vehicle, to control aerodynamic forces acting on the vehicle in a lateral direction relative to the longitudinal axis of the vehicle.

The above features and advantages and other features and advantages of the present teachings are readily apparent from the following detailed description of the best modes for carrying out the teachings when taken in connection with the accompanying drawings.

DETAILED DESCRIPTION

Figure 1:
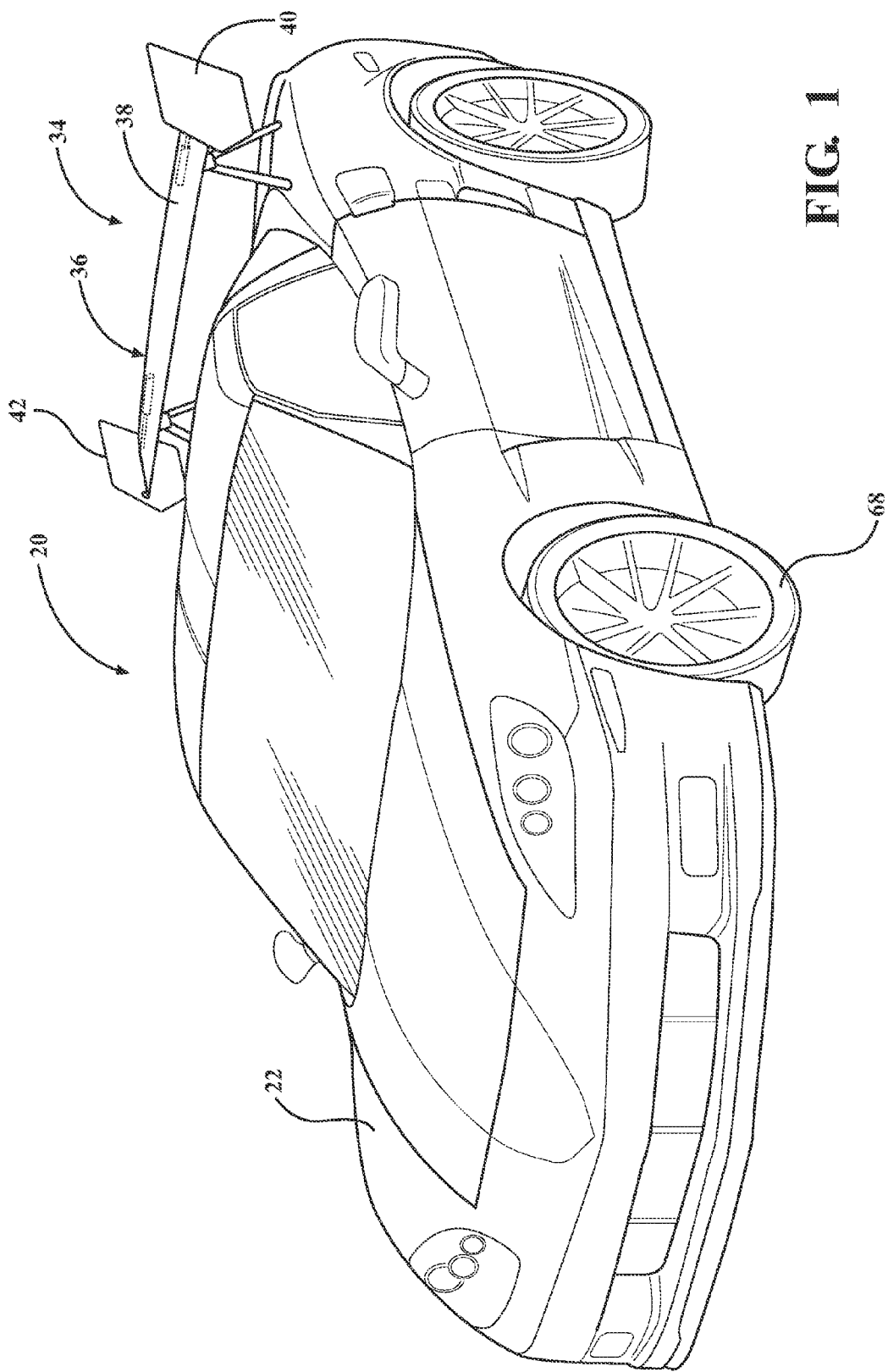
FIG. 1 is a schematic perspective view of a vehicle showing an aerodynamic control system.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. Referring to FIGS. 1 and 3-6, the vehicle 20 includes a body 22 that extends along a longitudinal axis 24, between a forward end and a rearward end. The body 22 defines a width 30 that is perpendicular to the longitudinal axis 24. The width 30 extends along a lateral cross axis 32 of the body 22, which is perpendicular to the longitudinal axis 24. The lateral cross axis 32 and the longitudinal axis 24 cooperate to define a horizontal plane that is positioned approximately parallel with a ground surface, and generally extends through a center of the vehicle 20.

The vehicle 20 includes an aerodynamic control system 34 that is attached to the body 22. The aerodynamic control system 34 controls and/or generates aerodynamic forces acting on the body 22 for improving the dynamic performance of the vehicle 20. The aerodynamic control system 34 includes a rear spoiler 36 having a central portion 38, a first side plate 40, and a second side plate 42. The first side plate 40 and the second side plate 42 may alternatively be referred to herein as the first vertical side plate 40 and the second vertical side plate 42 respectively.

The rear spoiler 36 is positioned adjacent the rearward end of the vehicle 20. The central portion 38 of the rear spoiler 36 extends laterally along or across the width 30 of the body 22, and is disposed generally parallel with the horizontal plane defined by the longitudinal axis 24 and the lateral cross axis 32. The central portion 38 of the rear spoiler 36 may be configured for generating a downforce on the body 22 in response to air flowing across the central portion 38 in the direction of the longitudinal axis 24.

Referring to FIGS. 3 through 6, the first side plate 40 is disposed at a first lateral edge 44 of the central portion 38. The first side plate 40 is includes a substantially planar structure that is positioned in a substantially vertical orientation, and is generally disposed along a first plane when positioned in a parallel, generally forward position. The first plane is oriented to extend generally vertically relative to the horizontal plane defined by the longitudinal axis 24 and the lateral cross axis 32, and to extend generally along or parallel with the longitudinal axis 24 of the body 22.

Figure 3:
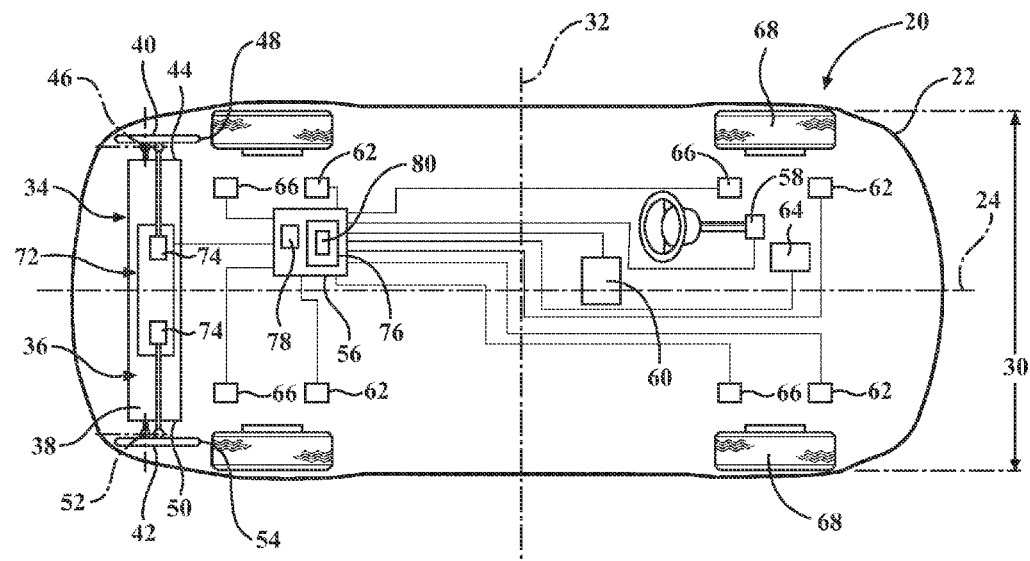
FIG. 3 is a schematic plan view of the vehicle showing an optimal position for the aerodynamic control system in a forward moving, non-decelerating condition.
Figure 4:
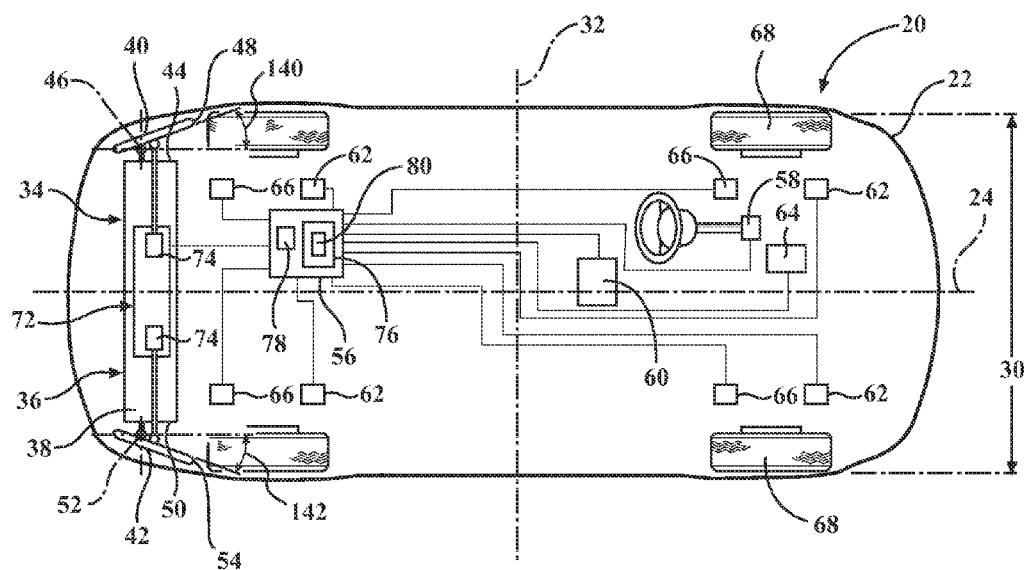
FIG. 4 is a schematic plan view of the vehicle showing an optimal position of the aerodynamic control system in a forward moving, decelerating condition.
Figure 5:
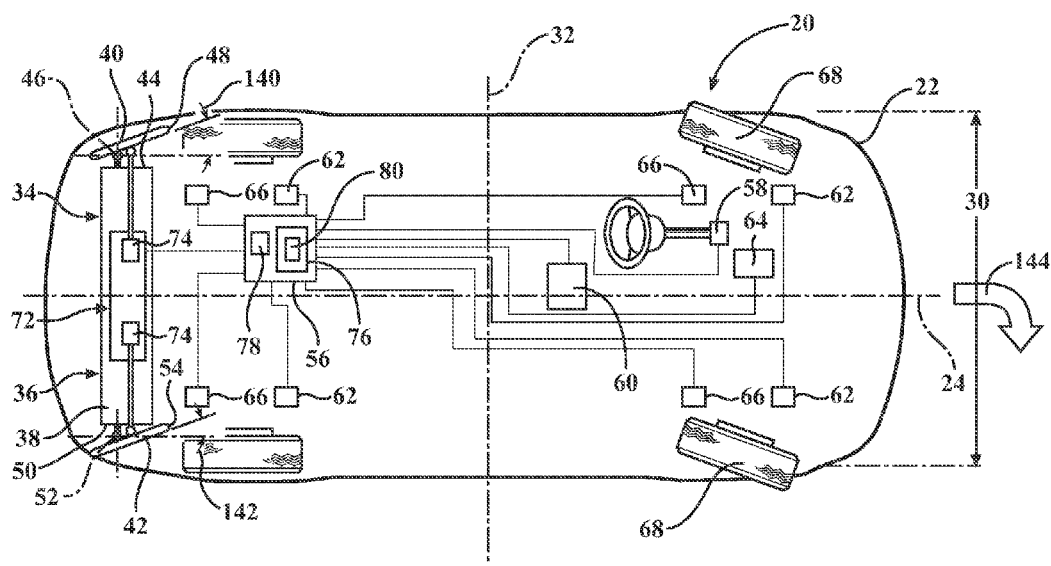
FIG. 5 is a schematic plan view of the vehicle showing an optimal position of the aerodynamic control system in a high lateral force turning condition.
Figure 6:
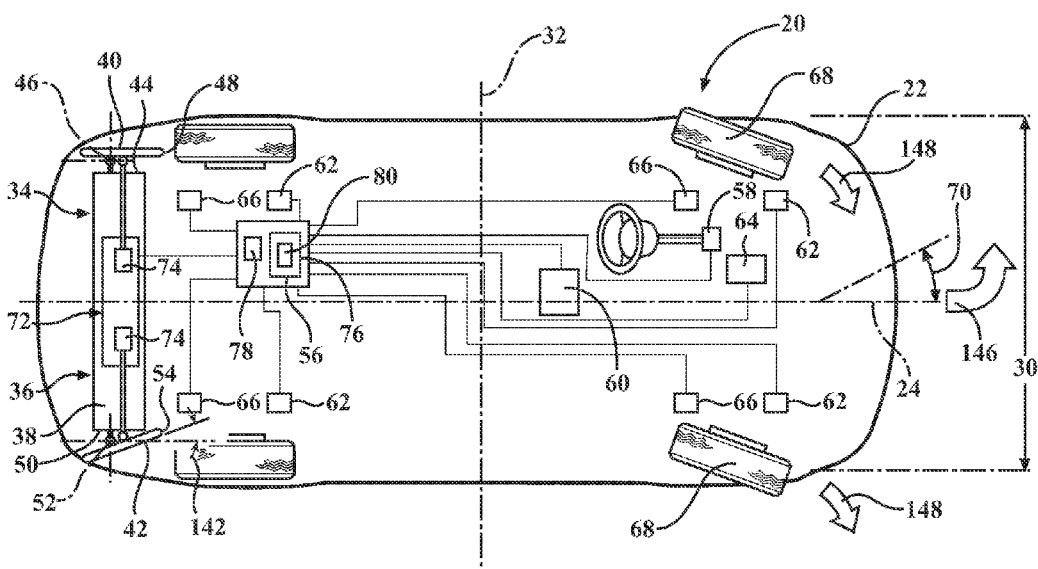
FIG. 6 is a schematic plan view of the vehicle showing an optimal position of the aerodynamic control system in an over-steer, sliding condition.

The first side plate 40 is rotatable relative to the central portion 38 and the body 22 of the vehicle 20, about a first vertical axis 46. The first vertical axis 46 is preferably disposed on the first plane. The first side plate 40 is rotatable about the first vertical axis 46 to change a yaw angle of the first side plate 40 relative to the longitudinal axis 24 of the vehicle 20. A forward edge 48 of the first vertical plate may be rotated either inward toward the longitudinal axis 24, or outward away from the longitudinal axis 24. The yaw angle of the first side plate 40 is the angle disposed on the horizontal plane between the first side plate 40 and the longitudinal axis 24. For example, if the first side plate 40 is orientated to extend parallel with the longitudinal axis 24, such as shown in FIGS. 3 and 6, the yaw angle of the first side plate 40 would equal zero. Alternatively, if the first side plate 40 is orientated to define an angle between the first side plate 40 and the longitudinal axis 24, such as shown in FIGS. 4 and 5, then the yaw angle of the first side plate 40 is equal to the angle between the first side plate 40 and the longitudinal axis 24, measured on the horizontal plane. The yaw angle of the first side plate 40 may be either inward toward the longitudinal axis 24, or outward away from the longitudinal axis 24.

The second side plate 42 is disposed at a second lateral edge 50 of the central portion 38. The first lateral edge 44 and the second lateral edge 50 of the central portion 38 of the rear spoiler 36 are disposed on opposing sides of the body 22, across the longitudinal axis 24 from each other. The second side plate 42 includes a substantially planar structure that is positioned in a substantially vertical orientation, and is generally disposed along a second plane when positioned in a parallel, generally forward position. The second plane is oriented to extend generally vertically relative to the horizontal plane defined by the longitudinal axis 24 and the lateral cross axis 32, and to extend generally along or parallel with the longitudinal axis 24 of the body 22.

The second side plate 42 is rotatable relative to the central portion 38 and the body 22 of the vehicle 20, about a second vertical axis 52. The second vertical axis 52 is preferably disposed on the second plane. The second side plate 42 is rotatable about the second vertical axis 52 to change a yaw angle of the second side plate 42 relative to the longitudinal axis 24 of the vehicle 20. A forward edge 54 of the second vertical side plate 42 may be rotated either inward toward the longitudinal axis 24, or outward away from the longitudinal axis 24. The yaw angle of the second side plate 42 is the angle disposed between the second side plate 42 and the longitudinal axis 24, measured on the horizontal plane. For example, if the second side plate 42 is orientated to extend parallel with the longitudinal axis 24, such as shown in FIG. 3, the yaw angle of the second side plate 42 would equal zero. Alternatively, if the second side plate 42 is orientated to define an angle between the second side plate 42 and the longitudinal axis 24, such as shown in FIGS. 4-6, then the yaw angle of the second side plate 42 is equal to the angle on the horizontal plane between the second side plate 42 and the longitudinal axis 24. The yaw angle of the second side plate 42 may be either inward toward the longitudinal axis 24, or outward away from the longitudinal axis 24.

The vehicle 20 includes at least one sensor, disposed in communication with a vehicle 20 controller 56, and operable to provide data to the controller 56. The at least one vehicle 20 sensor may include, but is not limited to at least one of a steering wheel angle sensor 58, a vehicle yaw sensor 60, a wheel speed sensor 62 for each wheel of the vehicle 20, a throttle position sensor 64, or a brake fluid pressure sensor 66 for each brake caliper of each wheel of the vehicle 20. The steering wheel angle sensor 58 is operable to sense data related to the angular position of a steering wheel 68 to determine a position and/or orientation of the steering wheels 68 of the vehicle 20, i.e., the wheels that turn relative to the body 22. The vehicle yaw sensor 60 is operable to sense data related to a yaw angle 70 of the body 22, shown in FIG. 6. The yaw angle 70 of the body 22 is defined herein as the angle, right or left, between the longitudinal axis 24 of the body 22 and a direction of travel of the body 22 on the horizontal plane defined by the longitudinal axis 24 and lateral cross axis 32 of the body 22. Each wheel speed sensor 62 is operable to sense a rotational speed of its respective wheel. Each brake fluid pressure sensor 66 is operable to sense a brake fluid pressure being applied at its respective brake caliper. The throttle position sensor 64 is operable to sense a position of a throttle pedal. It should be appreciated that the vehicle 20 may include other sensors for sensing other operating conditions of the vehicle 20, which may be used by the controller 56 as described below.

Referring to FIGS. 3 through 6, the aerodynamic control system 34 further includes an actuating system 72, which is coupled to each of the first side plate 40 and the second side plate 42. The actuating system 72 is operable to move the first side plate 40 and the second side plate 42, independently of each other, about the first vertical axis 46 and the second vertical axis 52 respectively. The actuating system 72 may include at least one actuator 74 that is coupled to the first side plate 40 and the second side plate 42, and operable to move the first side plate 40 and the second side plate 42, in response to a control signal from the vehicle 20 controller 56. The actuator 74 may include, but is not limited to, one of an electric actuator 74, a hydraulic actuator 74, or a pneumatic actuator 74. The actuating system 72 may further include all connections, linkages, drives, gearing, etc., necessary to couple the actuator 74 to the first side plate 40 and the second side plate 42 respectively.

The controller 56 includes a tangible non-transitory memory 76 having computer executable instructions recorded thereon, including an aerodynamic control module 80. The controller 56 further includes a processor 78 that is operable to execute the aerodynamic control module 80 to determine a spatial orientation of the body 22 relative to a direction of travel of the body 22, and to determine an optimal position for each of the first side plate 40 and the second side plate 42 respectively, relative to the longitudinal axis 24. The controller 56 is also operable to signal the actuating system 72 to position the first side plate 40 and the second side plate 42 in their respective optimal positions. The aerodynamic control module 80 uses the data from the vehicle 20 sensor(s) to determine the spatial orientation of the body 22 relative to a direction of travel of the body 22.

The controller 56 may be embodied as one or multiple digital computers or host machines each having one or more processors 78, read only memory 76 (ROM), random access memory 76 (RAM), electrically-programmable read only memory 76 (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 76 may include any non-transitory/tangible medium which participates in providing data or computer-readable instructions. Memory 76 may be non-volatile or volatile. Non-volatile media may include, for example, optical or magnetic disks and other persistent memory 76. Example volatile media may include dynamic random access memory 76 (DRAM), which may constitute a main memory 76. Other examples of embodiments for memory 76 include a floppy, flexible disk, or hard disk, magnetic tape or other magnetic medium, a CD-ROM, DVD, and/or any other optical medium, as well as other possible memory 76 devices such as flash memory 76.

Figure 2:
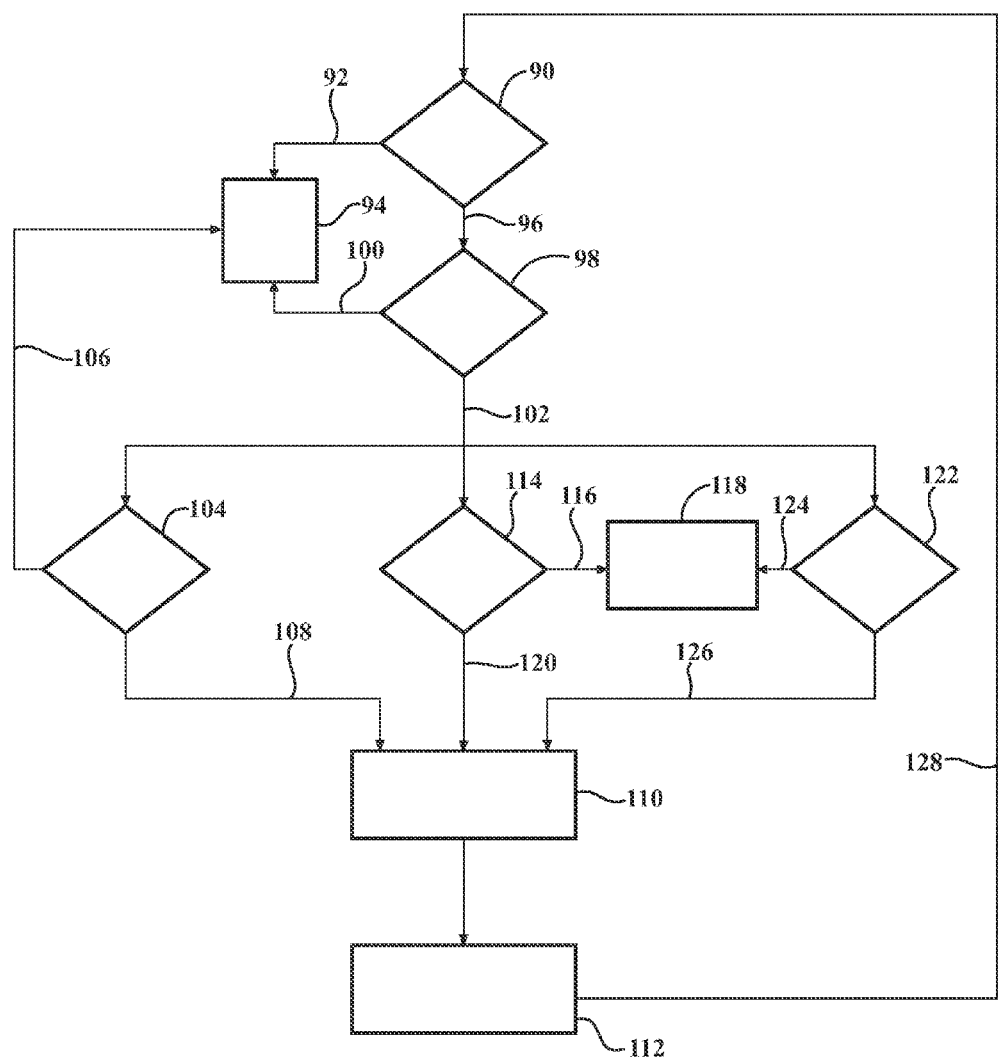
FIG. 2 is a flowchart showing a method of controlling the vehicle.

Referring to FIG. 2, a process that the controller 56 follows to determine whether or not to activate the aerodynamic control system 34 to move the first side plate 40 and the second side plate 42 out of their parallel, generally forward positions, and into their respective optimal positions for the current driving conditions of the vehicle 20, is generally shown. The controller 56 first determines, generally indicated by box 90, if a transmission of the vehicle 20 is disposed in a forward drive position, or if the transmission of the vehicle 20 is disposed in a non-forward drive position, such as reverse, park, parallel, etc. If the controller 56 determines that the transmission is disposed in a non-forward drive position, generally indicated at 92, then the controller 56 does not activate the aerodynamic control system 34, generally indicated by box 94, and the first side plate 40 and the second side plate 42 remain in their respective parallel, generally forward positions. If the controller 56 determines that the transmission is disposed in a forward drive position, generally indicated at 96, then the controller 56 continues to determine if a speed of the vehicle 20 is equal to or greater than a calibrated minimum speed, or if the speed of the vehicle 20 is less than the calibrated minimum speed, generally indicated by box 98. The calibrated minimum speed is a lower speed, below which the controller 56 does not activate the aerodynamic control system 34. The calibrated minimum speed may be defined to include any desirable value for each specific vehicle 20.

If the controller 56 determines that the speed of the vehicle 20 is less than the calibrated minimum speed, generally indicated at 100, then the controller 56 either does not activate the aerodynamic control system 34, generally indicated by box 94, and the first side plate 40 and the second side plate 42 remain in their respective parallel, generally forward positions, or the controller 56 returns the first side plate 40 and the second side plate 42 to their respective parallel, generally forward positions. If the controller 56 determines that the speed of the vehicle 20 is equal to or greater than the calibrated minimum speed, generally indicated at 102, then the controller 56 continues to determine, generally indicated by box 104, if the angular displacement of the steering wheel, measured from a parallel position, is equal to or greater than a calibrated minimum angular displacement, or if the angular displacement of the steering wheel is less than the calibrated minimum angular displacement.

If the controller 56 determines that the angular displacement of the steering wheel is less than the calibrated minimum angular displacement, generally indicated at 106, then the controller 56 either does not activate the aerodynamic control system 34, generally indicated by box 94, and the first side plate 40 and the second side plate 42 remain in their respective parallel, generally forward positions, or the controller 56 returns the first side plate 40 and the second side plate 42 to their respective parallel, generally forward positions. However, if the controller 56 determines that the angular displacement of the steering wheel is equal to or greater than the calibrated minimum angular displacement, generally indicated at 108, then the controller 56 calculates, generally indicated by box 110, an optimal position for each of the first side plate 40 and the second side plate 42, for the current operating conditions of the vehicle 20, and signals, generally indicated by box 112, the actuating system 72 to move the first side plate 40 and the second side plate 42 to their respective optimal positions.

When the controller 56 determines that the speed of the vehicle 20 is equal to or greater than the calibrated minimum speed, generally indicated at 102, then the controller 56 continues to determine, generally indicated by box 114, if a lateral force of the vehicle 20 is equal to or greater than a calibrated minimum force, or if the lateral force of the vehicle 20 is less than the calibrated minimum force.

If the controller 56 determines that the lateral force of the vehicle 20 is less than the calibrated minimum force, generally indicated at 116, then the controller 56 either does not activate the aerodynamic control system 34, generally indicated by box 118, and the first side plate 40 and the second side plate 42 remain in their respective parallel, generally forward positions, or the controller 56 returns the first side plate 40 and the second side plate 42 to their respective parallel, generally forward positions. However, if the controller 56 determines that the lateral force of the vehicle 20 is equal to or greater than the calibrated minimum force, generally indicated at 120, then the controller 56 calculates, generally indicated by box 110, an optimal position for each of the first side plate 40 and the second side plate 42, for the current operating conditions of the vehicle 20, and signals, generally indicated by box 112, the actuating system 72 to move the first side plate 40 and the second side plate 42 to their respective optimal positions.

Additionally, when the controller 56 determines that the speed of the vehicle 20 is equal to or greater than the calibrated minimum speed, generally indicated at 102, then the controller 56 continues to determine, generally indicated by box 122, if a brake fluid pressure currently being applied at the brake caliper of one of the wheels is equal to or greater than a calibrated minimum brake fluid pressure, or if the brake fluid pressure currently being applied to all of the wheels is less than the calibrated minimum brake fluid pressure. The calibrated minimum brake fluid pressure may be dependent upon, for example, the aerodynamic performance of the vehicle 20, the anticipated driving situations of the vehicle 20, a desired performance and/or efficiency level of the vehicle 20, or on many other different considerations.

Determining if a brake fluid pressure currently being applied at the brake caliper of one of the wheels is equal to or greater than a calibrated minimum brake fluid pressure, or is less than the calibrated minimum brake fluid pressure includes sensing the brake fluid pressure being applied to each caliper controlling each wheel of the vehicle 20. The corner brake fluid pressure of the vehicle 20 may be sensed in any suitable manner, such as but not limited to sensing a brake fluid pressure at each wheel's brake caliper with the brake fluid pressure sensor 66 located at each wheel's brake caliper respectively, or via predictive modeling in the brake controller that can provide this data. The brake fluid pressure may be analyzed to determine if the vehicle 20 is actively operating a stability control system, by applying brake fluid pressure to one corner of the vehicle 20 more than the other corners of the vehicle 20. The brake fluid pressure acting on each wheel is sensed to determine if the brake fluid pressure being applied to each of the wheels is less than, equal to or greater than the calibrated minimum brake fluid pressure.

If the controller 56 determines that the brake fluid pressure currently being applied at one of the wheels is less than the calibrated minimum brake fluid pressure, generally indicated at 124, then the controller 56 may determine that the vehicle 20 is not actively or currently operating a stability control system, and either does not activate the aerodynamic control system 34, generally indicated by box 118, and the first side plate 40 and the second side plate 42 remain in their respective parallel, generally forward positions, or the controller 56 returns the first side plate 40 and the second side plate 42 to their respective parallel, generally forward positions. However, if the controller 56 determines that the brake fluid pressure currently being applied at one of the wheels is equal to or greater than the calibrated minimum brake fluid pressure, generally indicated at 126, then the controller 56 may determine that the vehicle 20 is actively operating a stability control system, and calculates, generally indicated by box 110, an optimal position for each of the first side plate 40 and the second side plate 42, for the current operating conditions of the vehicle 20, and signals, generally indicated by box 112, the actuating system 72 to move the first side plate 40 and the second side plate 42 to their respective optimal positions.

Once the controller 56 signals the actuating system 72 to move the first side plate 40 and the second side plate 42 into their respective optimal positions for the current operating conditions of the vehicle 20, the controller 56 continues to monitor the operating conditions of the vehicle 20, and continually and cyclically repeats the above described process, generally indicated at 128.

A method of controlling the vehicle 20, and particularly the aerodynamic control system 34 is described below. The method includes sensing at least one operating condition of the vehicle 20 with at least one of the vehicle 20 sensors. As described above, the vehicle 20 sensor may include, but is not limited to, at least one of the steering wheel angle sensor 58, the vehicle yaw sensor 60, the wheel speed sensor 62 for each wheel of the vehicle 20, the throttle position sensor 64, or the brake fluid pressure sensor 66 at each brake caliper of each wheel of the vehicle 20. Sensing the operating condition(s) of the vehicle 20 may include, but are not limited to, sensing at least one of the steering wheel angle with the steering wheel angle sensor 58, the vehicle yaw position with the vehicle yaw sensor 60, the wheel speed of each wheel with its respective wheel speed sensor 62, the position of the throttle pedal with the throttle position sensor 64, and the applied brake fluid pressure at each brake caliper of each wheel with its respective brake fluid pressure sensor 66.

Once the data related to the current operating conditions of the vehicle 20 is sensed, the sensor(s) sends the sensed data related to the current operating condition of the vehicle 20 to the controller 56. The controller 56 uses the data from the various different sensors to determine whether or not to activate the aerodynamic control system 34, and if so, to determine the optimal positions of the first side plate 40 and the second side plate 42 respectively, for the current operating conditions of the vehicle 20. The data may be sent from the various sensors to the controller 56 in any manner suitable for communicating data between different components of the vehicle 20.

If the controller 56 determines that the current operating conditions of the vehicle 20 require activation of the aerodynamic control system 34, then the controller 56 determines a current spatial orientation of the body 22 relative to a current direction of travel of the body 22. Determining the current spatial orientation of the body 22 relative to the current direction of travel of the vehicle 20 may include, for example, determining if the longitudinal axis 24 of the body 22 is parallel with the current direction of travel of the vehicle 20, or if the longitudinal axis 24 of the body 22 is not parallel with the current direction of travel of the vehicle 20. The controller 56 may examine the yaw angle 70 of the vehicle 20, for example, to determine if the longitudinal axis 24 of the body 22 is parallel with the current direction of travel of the vehicle 20. If the yaw angle 70 is equal to zero, then the longitudinal axis 24 of the body 22 is parallel with the direction of travel of the vehicle 20. However, if the yaw angle 70 of the vehicle 20 includes a value different than zero, than the longitudinal axis 24 of the body 22 is not parallel with the current direction of travel of the vehicle 20.

Determining the current spatial orientation of the body 22 relative to the current direction of travel of the vehicle 20 may further include determining if the vehicle brake system is currently being applied to decelerate the vehicle 20, i.e., is the vehicle 20 decelerating. The controller 56 may examine the wheel speed at each wheel of the vehicle 20 to determine if the vehicle 20 is decelerating, if the vehicle 20 is accelerating, or if the speed of the vehicle 20 remains constant over time.

Determining the current spatial orientation of the body 22 relative to the current direction of travel of the vehicle 20 may further include determining a current turn direction. The controller 56 may examine the angular position of the steering wheel to determine if the steering wheels 68 of the vehicle 20 are rotated for a right turn, or if the steering wheels 68 of the vehicle 20 are rotated for a left turn.

Determining the current spatial orientation of the body 22 relative to the current direction of travel of the vehicle 20 may further include determining if the yaw angle 70 of the body 22 is angled, relative to the longitudinal axis 24, in the same direction as the current turn direction of the vehicle 20. If the yaw angle 70 of the body 22 is directed in the same direction as the current turn direction, then the controller 56 may determine that the vehicle 20 is turning in the direction of the current turn direction, i.e., the direction in which the steering wheels 68 of the vehicle 20 are rotated or angled. If, however, the yaw angle 70 of the body 22 is directed in a direction opposite the current turn direction, then the controller 56 may determine that the vehicle 20 is in an over-steer condition, such as a slide.

Once the controller 56 determines the current spatial orientation of the body 22 relative to the current direction of travel of the body 22, the controller 56 then determines the optimal position for each of the first vertical side plate 40 and the second vertical side plate 42 respectively, relative to the longitudinal axis 24, for the current spatial orientation of the body 22 relative to the current direction of travel of the body 22. The optimal positions for each of the first vertical side plate 40 and the second vertical side plate 42 are calculated to optimize the performance of the vehicle 20 for the current operating conditions.

The optimal position for the first vertical side plate 40 may include either a positive yaw angle, a negative yaw angle, or the parallel position of the first vertical side plate 40. When the first side plate 40 is positioned with a positive yaw angle, the forward edge 48 of the first vertical side plate 40 is angled away from the longitudinal axis 24 to define a yaw angle. The yaw angle of the first vertical side plate 40 may vary depending upon the magnitude of the current operating conditions of the vehicle 20. When the first side plate 40 is positioned with a negative yaw angle, the forward edge 48 of the first vertical side plate 40 is angled toward the longitudinal axis 24 to define a yaw angle. The yaw angle may vary depending upon the magnitude of the current operating conditions of the vehicle 20. When the first side plate 40 is positioned in its parallel, generally forward position, the forward edge 48 of the first vertical side plate 40 is positioned to define a zero yaw angle relative to the longitudinal axis 24 of the vehicle 20.

The optimal position for the second vertical side plate 42 may include either a positive yaw angle, a negative yaw angle, or the parallel position of the second vertical side plate 42. When the second side plate 42 is positioned with a positive yaw angle, the forward edge 54 of the second vertical side plate 42 is angled away from the longitudinal axis 24 to define a yaw angle. The yaw angle may vary depending upon the magnitude of the current operating conditions of the vehicle 20. When the second side plate 42 is positioned with a negative yaw angle, the forward edge 54 of the second vertical side plate 42 is angled toward the longitudinal axis 24 to define a yaw angle. The yaw angle may vary depending upon the magnitude of the current operating conditions of the vehicle 20. When the second side plate 42 is positioned in its parallel, generally forward position, the forward edge 54 of the second vertical side plate 42 is positioned to define a zero yaw angle relative to the longitudinal axis 24 of the vehicle 20.

Once the controller 56 determines the optimal position for each of the first vertical side plate 40 and the second vertical side plate 42, the controller 56 then signals the actuating system 72 to move the first vertical side plate 40 and the second vertical side plate 42 into their respective optimal positions. The actuating system 72 then moves the first vertical side plate 40 and the second vertical side plate 42 into their respective optimal positions.

Referring to FIG. 3, when the controller 56 determines that the longitudinal axis 24 of the body 22 is aligned with the current direction of travel of the vehicle 20 and the vehicle brake system is not currently being applied to decelerate the vehicle 20, moving the first vertical side plate 40 and the second vertical side plate 42 into their respective optimal positions includes moving each of the first vertical side plate 40 and the second vertical side plate 42 into their respective parallel positions, in which the first vertical side plate 40 and the second vertical side plate 42 are generally parallel with the longitudinal axis 24 of the body 22.

Referring to FIG. 4, when the controller 56 determines that the longitudinal axis 24 of the body 22 is aligned with the current direction of travel of the vehicle 20 and the vehicle brake system is currently being applied to decelerate the vehicle 20, moving the first vertical side plate 40 and the second vertical side plate 42 into their respective optimal positions may include moving the forward vertical edge of the first vertical side plate 40 and the forward vertical edge of the second vertical side plate 42 laterally outward, away from the longitudinal axis 24 of the body 22. As shown in FIG. 4, both the first vertical side plate 40 and the second vertical side plate 42 are positioned to define a positive yaw angle, in which the forward edge 48 of the first vertical side plate 40 and the forward edge 54 of the second vertical side plate 42 are each angled away from the longitudinal axis 24.

The first vertical side plate 40 may be rotated about the first vertical axis 46 a first yaw angle 140 to move the forward vertical edge of the first vertical side plate 40 laterally away from the longitudinal axis 24. Similarly, the second vertical side plate 42 may be rotated about the second vertical axis 52 a second yaw angle 142 to move the forward vertical edge of the second vertical side plate 42 laterally away from the longitudinal axis 24. Preferably, the absolute value of the first yaw angle 140 is equal to the absolute value of the second yaw angle 142. In positioning the first vertical side plate 40 and the second vertical side plate 42 in this manner, the aerodynamic control system 34 assists in decelerating the vehicle 20, without producing any lateral forces that may be applied to the vehicle 20.

Referring to FIG. 5, when the controller 56 determines that the steering wheels 68 of the vehicle 20 are angled in the same direction as the current turn direction of the vehicle 20, i.e., the vehicle 20 is turning in the direction that the steering wheels 68 of the vehicle 20 are angled, moving the first vertical side plate 40 and the second vertical side plate 42 into their respective optimal positions includes rotating the first vertical side plate 40 about the first vertical axis 46 and the second vertical side plate 42 about the second vertical axis 52 in the same direction, which is opposite the current turn direction. For example, as shown in FIG. 5, the current turn direction is indicated by arrow 144 as a right turn, and the steering wheels 68 of the vehicle 20 are angled in the same direction as the current right turn, i.e., the steering wheels 68 are angled to the right. The first vertical side plate 40 is angled to the left to define a positive yaw angle, and the second vertical side plate 42 is angled to the left to define a negative yaw angle. The first vertical side plate 40 may be angled to define a first yaw angle 140 to position the first vertical side plate 40 at a yaw angle opposite the current turn direction, and the second vertical side plate 42 may be angled to define a second yaw angle 142 to position the second vertical side plate 42 at a yaw angle opposite the current turn direction. The absolute value of the first yaw angle 140 may be equal to the absolute value second yaw angle 142. However, the absolute value of the first yaw angle 140 may not equal the absolute value of the second yaw angle 142. It should be appreciated that in the exemplary embodiment shown in FIG. 5, the first yaw angle 140 of the first vertical side plate 40 is a positive yaw angle, and the second yaw angle 142 of the second vertical side plate 42 is a negative yaw angle. This is because the first vertical side plate 40 and the second vertical side plate 42 are angled in the same direction. This positioning of the first vertical side plate 40 and the second vertical side plate 42 generates lateral forces on the vehicle 20 that assist turning the vehicle 20, and help prevent an over-steer condition. It should be appreciated that that if the current turn direction of the vehicle 20 and the current angle of the steering wheels 68 is reversed from the example shown in FIG. 5, that the relative positions of the first vertical side plate 40 and the second vertical side plate 42 would be reversed, such that the first vertical side plate 40 would be positioned to define a negative yaw angle, and the second vertical side plate 42 would be positioned to define a positive yaw angle.

Referring to FIG. 6, when the controller 56 determines that the steering wheels 68 of the vehicle 20 are angled in a direction opposite the current turn direction of the vehicle 20, moving the first vertical side plate 40 and the second vertical side plate 42 into their respective optimal positions includes rotating one of the first vertical side plate 40 or the second vertical side plate 42 to position the one of either the first vertical side plate 40 or the second vertical side plate 42 at a yaw angle directed in the same direction as the current turn direction, and moving the other of the first vertical side plate 40 and the second vertical side plate 42 into its respective parallel position, parallel with the longitudinal axis 24 of the body 22. For example, as shown in FIG. 6, the current turn direction is indicated by arrow 146 as a left turn, and the steering wheels 68 of the vehicle 20 are angled in the opposite direction as the current right turn, i.e., the steering wheels 68 are angled to the right, as indicated by arrows 148. The first vertical side plate 40 is positioned in its respective parallel position, and the second vertical side plate 42 is positioned to define a negative yaw angle, i.e., is angled inward toward the longitudinal axis 24. This positioning of the first vertical side plate 40 and the second vertical side plate 42 generates lateral forces on the vehicle 20 that help correct the over-steer condition. It should be appreciated that if the current turn direction of the vehicle 20 and the current angle of the steering wheels 68 is reversed from the example shown in FIG. 6, that the relative positions of the first vertical side plate 40 and the second vertical side plate 42 would be reversed, such that the first vertical side plate 40 would be positioned to define a negative yaw angle, and the second vertical side plate 42 would be positioned in its respective parallel position.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
   a body extending along a longitudinal axis and having a width perpendicular to the longitudinal axis;
   an aerodynamic control system attached to the body, the aerodynamic control system including:
      a central portion extending laterally along the width of the body;
      a first side plate disposed at a first lateral edge of the central portion, positioned in a substantially vertical orientation, and extending in a direction substantially parallel with the longitudinal axis of the body;
      a second side plate disposed at a second lateral edge of the central portion, positioned in a substantially vertical orientation, and extending in a direction substantially parallel with the longitudinal axis of the body; and
      an actuating system coupled to each of the first side plate and the second side plate, and operable to move the first side plate and the second side plate independently of each other about a first vertical axis and a second vertical axis respectively.

2. The vehicle set forth in claim 1 wherein the first side plate is rotatable about the first vertical axis to change a yaw angle of the first side plate relative to the longitudinal axis of the vehicle.

3. The vehicle set forth in claim 2 wherein the second side plate is rotatable about the second vertical axis to change a yaw angle of the second side plate relative to the longitudinal axis of the vehicle.

4. The vehicle set forth in claim 1 wherein the aerodynamic control system includes a controller having tangible non-transitory memory having computer executable instructions recorded thereon, including an aerodynamic control module.

5. The vehicle set forth in claim 4 wherein the controller includes a processor operable to execute the aerodynamic control module to determine a spatial orientation of the body relative to a direction of travel of the body, and to determine an optimal position for each of the first side plate and the second side plate respectively, relative to the longitudinal axis, and signal the actuating system to position the first side plate and the second side plate in their respective optimal positions.

6. The vehicle set forth in claim 5 further comprising at least one sensor in communication with the controller for providing data to the controller, wherein the aerodynamic control module uses the data from the at least one sensor to determine the spatial orientation of the body relative to a direction of travel of the body.

7. The vehicle set forth in claim 1 wherein the actuating system includes at least one actuator coupled to the first side plate and the second side plate, and operable to move the first side plate and the second side plate in response to a control signal.

8. The vehicle set forth in claim 7 wherein the actuator includes one of an electric actuator, a hydraulic actuator, or a pneumatic actuator.

9. A method of controlling a vehicle including a body, and a rear spoiler having a central portion, a first vertical side plate disposed at a first lateral edge of the central portion, and a second vertical side plate disposed at a second lateral edge of the central portion, the method comprising:
   sensing at least one operating condition of the vehicle with at least one vehicle sensor;
   determining a current spatial orientation of the body relative to a current direction of travel of the body, with a controller including tangible non-transitory memory having computer executable instructions recorded thereon, including an aerodynamic control module, and a processor operable to execute the aerodynamic control module to determine the current spatial orientation of the body relative to the current direction of travel of the body, from the sensed operating condition of the vehicle;
   determining an optimal position for each of the first vertical side plate and the second vertical side plate respectively, relative to the longitudinal axis, for the current spatial orientation of the body relative to the current direction of travel of the body, with the aerodynamic control module of the controller,
   signaling an actuating system with the controller to move the first vertical side plate and the second vertical side plate into their respective optimal positions for the current spatial orientation of the body relative to the current direction of travel of the body; and moving the first vertical side plate and the second vertical side plate into their respective optimal positions with the actuating system.

10. The method set forth in claim 9 wherein the at least one vehicle sensor includes at least one of a steering wheel angle sensor, a vehicle yaw sensor, a wheel speed sensor for each wheel of the vehicle, a throttle position sensor, or a brake fluid pressure sensor at a brake caliper of each wheel of the vehicle, and wherein sensing at least one operating condition of the vehicle includes sensing at least one of a steering wheel angle with the steering wheel angle sensor, a vehicle yaw position with the vehicle yaw sensor, a wheel speed of each wheel with its respective wheel speed sensor, a position of a throttle pedal with the throttle position sensor, and an applied brake fluid pressure at the brake caliper of each wheel with its respective brake fluid pressure sensor.

11. The method set forth in claim 10 further comprising sending data from the at least one vehicle sensor related to the at least one operating condition of the vehicle to the controller.

12. The method set forth in claim 10 wherein determining the current spatial orientation of the body relative to the current direction of travel of the vehicle includes determining if a longitudinal axis of the body is parallel with the current direction of travel of the vehicle, or if the longitudinal axis of the body is not parallel with the current direction of travel of the vehicle.

13. The method set forth in claim 12 wherein determining the current spatial orientation of the body relative to the current direction of travel of the vehicle includes determining if a vehicle brake system is currently being applied to decelerate the vehicle.

14. The method set forth in claim 13 wherein determining the current spatial orientation of the body relative to the current direction of travel of the vehicle includes determining a current turn direction.

15. The method set forth in claim 14 wherein determining the current spatial orientation of the body relative to the current direction of travel of the vehicle includes determining if a yaw angle of the body is angled, relative to the longitudinal axis, in the same direction as the current turn direction of the vehicle.

16. The method set forth in claim 15 wherein moving the first vertical side plate and the second vertical side plate into their respective optimal positions with the actuating system includes moving a forward vertical edge of each of the first vertical side plate and the second vertical side plate laterally outward, away from the longitudinal axis of the body, when the controller determines that the longitudinal axis of the body is parallel with the current direction of travel of the vehicle and the vehicle brake system is currently being applied to decelerate the vehicle.

17. The method set forth in claim 16 wherein the first vertical side plate is rotated about a first vertical axis a first yaw angle to move the forward vertical edge of the first vertical side plate laterally away from the longitudinal axis, and the second vertical side plate is rotated about a second vertical axis a second yaw angle to move the forward vertical edge of the second vertical side plate laterally away from the longitudinal axis, with the absolute value of the first yaw angle equal to the absolute value of the second yaw angle.

18. The method set forth in claim 15 wherein moving the first vertical side plate and the second vertical side plate into their respective optimal positions with the actuating system includes moving each of the first vertical side plate and the second vertical side plate into a parallel position, parallel with the longitudinal axis of the body, when the controller determines that the longitudinal axis of the body is parallel with the current direction of travel of the vehicle and the vehicle brake system is not currently being applied to decelerate the vehicle.

19. The method set forth in claim 15 wherein moving the first vertical side plate and the second vertical side plate into their respective optimal positions with the actuating system includes rotating the first vertical side plate about a first vertical axis a first yaw angle to position the first vertical side plate at a yaw angle opposite the current turn direction, and rotating the second vertical side plate about a second vertical axis a second yaw angle to position the second vertical side plate at a second yaw angle opposite the current turn direction, when the controller determines that the steering wheels of the vehicle are angled in the same direction as the current turn direction of the vehicle.

20. The method set forth in claim 15 wherein moving the first vertical side plate and the second vertical side plate into their respective optimal positions with the actuating system includes rotating one of the first vertical side plate or the second vertical side plate about a first vertical axis or a second vertical axis respectively to position the one of either the first vertical side plate or the second vertical side plate at a yaw angle directed in the same direction as the current turn direction, and moving the other of the first vertical side plate and the second vertical side plate into an parallel position, parallel with the longitudinal axis of the body, when the controller determines that the steering wheels of the vehicle are angled in a direction opposite the current turn direction of the vehicle.

* * * * *